(12) United States Patent
Syamoto

(10) Patent No.: US 6,439,014 B1
(45) Date of Patent: Aug. 27, 2002

(54) SHIFT LEVER DEVICE

(75) Inventor: Noriyasu Syamoto, Aichi-ken (JP)

(73) Assignee: Kabushiki Kaisha Tokai-Rika-Denki-Seisakusho, Aichi (JP)

( * ) Notice: Subject to any disclaimer, the term of this patent is extended or adjusted under 35 U.S.C. 154(b) by 33 days.

(21) Appl. No.: 09/612,313

(22) Filed: Jul. 7, 2000

(30) Foreign Application Priority Data

Jul. 7, 1999 (JP) ............................................. 11-192738

(51) Int. Cl.⁷ ......................... B60R 25/06; E05B 65/12
(52) U.S. Cl. ............................................. 70/247; 70/252
(58) Field of Search ........................... 74/475; 70/247, 70/248, 252

(56) References Cited

U.S. PATENT DOCUMENTS

| | | | | | |
|---|---|---|---|---|---|
| 4,854,193 A | * | 8/1989 | Newman et al. | ............... | 74/850 |
| 4,936,158 A | * | 6/1990 | Livshits et al. | ............... | 74/475 |
| 5,085,096 A | | 2/1992 | Behrens | | |
| 5,207,124 A | * | 5/1993 | Anderson et al. | ............. | 74/878 |
| 5,226,303 A | * | 7/1993 | Dieden | ......................... | 70/247 |
| 5,289,907 A | * | 3/1994 | Pattock | ....................... | 192/4 A |
| 5,309,744 A | * | 5/1994 | Kito et al. | ................... | 70/247 |
| 5,511,641 A | * | 4/1996 | Snell et al. | .................. | 192/4 A |
| 5,566,583 A | * | 10/1996 | Suzuki | ........................ | 74/477 |
| 5,657,654 A | * | 8/1997 | Hoebel | ........................ | 70/247 |
| 5,662,001 A | * | 9/1997 | Smale | ...................... | 74/483 R |
| 5,860,303 A | | 1/1999 | Droz et al. | | |
| 6,006,887 A | * | 12/1999 | Tazai | ....................... | 192/220.2 |

FOREIGN PATENT DOCUMENTS

| | | |
|---|---|---|
| EP | 0 315 174 A1 | 5/1989 |
| EP | 0 334 672 A1 | 9/1989 |
| EP | 0 506 121 A1 | 9/1992 |
| GB | 2 253 197 | 9/1992 |

* cited by examiner

Primary Examiner—Anthony Knight
Assistant Examiner—John B. Walsh
(74) Attorney, Agent, or Firm—Nixon Peabody LLP; Thomas W. Cole

(57) ABSTRACT

When a shift lever is moved in the transverse direction of a vehicle to a "P" range, a driving lever which is pressed by the shift lever is moved to a released position and a slide member, which is connected to the driving lever via a wire connecting mechanism, is moved to a position at which a lock pin is separated from a lock cam. Further, when the shift lever is taken out of the "P" range, the driving lever is moved to a restricted position due to the urging force of a torsion spring, and the slide member is moved to a position at which the lock pin is engaged with the lock cam. In this way, mechanical operating force is directly supplied to a key interlock mechanism such that the structure of the key interlock mechanism is simplified.

16 Claims, 3 Drawing Sheets

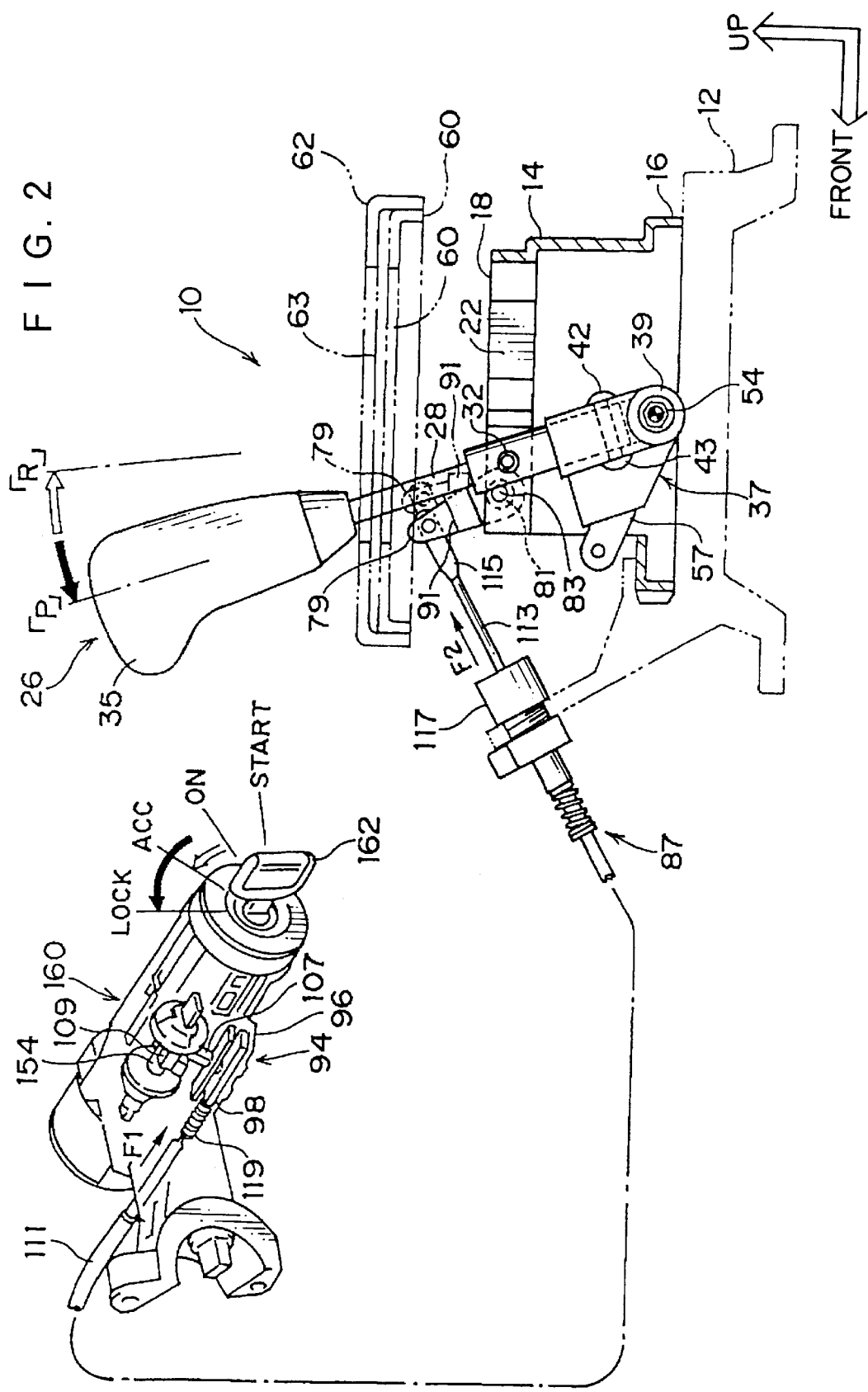

ed from the key cylinder at a shift range other than the LOCK position. Namely, the key, which is inserted into the key cylinder, can be removed only when the key cylinder is rotated to the LOCK position.

SHIFT LEVER DEVICE

BACKGROUND OF THE INVENTION

1. Field of the Invention

The present invention relates to a shift lever device which is used in the automatic transmission of a vehicle such as an automobile or the like and is used to effect switching of gear states or the like in the automatic transmission.

2. Description of the Related Art

In a shift lever device used in an automatic transmission, there is a so-called gate-type shift lever device in which shift directions are the longitudinal direction of a vehicle and the transverse direction thereof. This type of shift lever device has a structure in which when shifting is effected to one specific shift range (e.g., a parking (P) range) from another shift range, if the shift lever is not moved successively in the longitudinal direction of the vehicle and the transverse direction thereof, the shift lever does not reach the specific shift range. Further, in this type of shift lever device, a switch (hereinafter, "P detection switch"), which operates when the shift lever is moved to a "P" range, is provided for controlling a shift lock mechanism or the like.

An automobile, to which the above-described shift lever device is attached, is often provided with a key interlock mechanism in which when the shift lever is disposed in a shift range other than the "P" range, the rotation of a key cylinder, into which a key is inserted, from an ACC position to a LOCK position is prevented. Accordingly, in the vehicle provided with the key interlock mechanism, only after the shift lever is moved to the "P" range, the key cylinder is rotated to the LOCK position and the key can be removed from the key cylinder.

This type of key interlock mechanism includes, for example, an electromagnetic solenoid and a restricting member. The electromagnetic solenoid is controlled by an ECU (electronic control unit) in accordance with the operating state of the P detection switch which is provided at the shift lever device, and the restricting member is moved to a predetermined LOCK position and a predetermined unlocked position by this electromagnetic solenoid. When this restricting member is moved to the LOCK position, the restricting member is engaged with a cam portion of the key cylinder so that the rotation of the key cylinder is restricted. Moreover, when the restricting member is moved to the unlocked position, the restricting member is separated from the cam portion and the state in which the rotation of the key cylinder is restricted is released.

However, in the automobile in which the ECU controls the key interlock mechanism by electric signals sent from the P detection switch of the shift lever device, the key interlock mechanism requires an electromagnetic solenoid which receives power supply from the ECU and moves the restricting member. Further, the ECU must include a relay circuit for control and a power circuit for drive which operate by receiving the signals from the P detection switch. Thus, the structure of the key interlock mechanism including the ECU becomes complex, and therefore, the shift lever device becomes expensive.

SUMMARY OF THE INVENTION

With the aforementioned in view, an object of the present invention is to provide a shift lever device in which mechanical operating force is directly supplied to a key interlock mechanism and thereby the structure of the key interlock mechanism can be simplified.

A shift lever device of the present invention, comprises: a shift lever whose shift directions are the longitudinal direction of a vehicle and the transverse direction of the vehicle and which can be moved to any shift ranges including a parking range; a connecting member whose one end portion is connected to a key interlock mechanism for restricting the rotation of a key which is inserted into a key cylinder; a driving member which is connected to another end portion of the connecting member and is movable to a predetermined released position and a predetermined restricted position, when the driving member is moved from the released position to the restricted position, the driving member transmits operating force to the key interlock mechanism in a restricting direction via the connecting member and the rotation of the key is restricted by the key interlock mechanism, and when the driving member is moved from the restricted position to the released position, the driving member transmits operating force to the key interlock mechanism in a releasing direction which is opposite the restricting direction via the connecting member and the restricted state of the key by the key interlock mechanism is released; a urging member which urges the driving member at the restricted position, and when the shift lever is withdrawn from the parking range, the urging member moves the driving member from the released position to the restricted position; and a pressed portion which is provided integrally with the driving member and is pressed by the shift lever which is moved to the parking range, the pressed portion moving the driving member from the restricted position to the released position against the urging force of the urging member.

In accordance with the shift lever device having the above-described structure, when the shift lever is taken out of the parking range, the urging member moves the driving member from the released position to the restricted position and the driving member transmits the operating force to the key interlock mechanism in the restricting direction via the connecting member. In this way, since the key interlock mechanism is disposed in the locked state and the rotation of the key which is inserted into the key cylinder is restricted, the key cannot be rotated to the LOCK position and cannot be removed from the key cylinder.

Further, when the shift lever is moved to the parking range, the pressed portion is pressed by the shift lever and moves the driving member from the restricted position to the released position against the urging force of the urging member, and the driving member transmits the operating force to the key interlock mechanism in the releasing direction via the connecting member. Accordingly, the locked state of the key interlock mechanism is released such that the key is rotated to the LOCK position and the key which is inserted into the key cylinder can be removed.

Consequently, if the above-structured shift lever is provided to a vehicle, by only using the driving member, which the connecting member and the pressed portion integrally formed thereupon, could directly transmit the mechanical operating force from the shift lever to the key interlock mechanism, thereby operating the key interlock mechanism which is interlocked with the operation of the shift lever. As a result, even if a driving source exclusively designed such as an electromagnetic solenoid or the like is not provided at the key interlock mechanism, the key interlock mechanism can be operated. Thus, the structures of the shift lever device and the key interlock mechanism can be simplified.

The key cylinder, into which the key is inserted, is rotatable to a plurality of positions including the LOCK position and is structured so that the key cannot be removed at a position other than the LOCK position. Therefore, when the key is removed from the key cylinder after an engine stops, the shift lever is always disposed in the parking range.

BRIEF DESCRIPTION OF THE DRAWINGS

FIG. 2 is a structural view showing the shift lever device and a key cylinder which includes a key interlock mechanism relating to the embodiment of the present invention.

DESCRIPTION OF THE PREFERRED EMBODIMENTS

Figure 1:
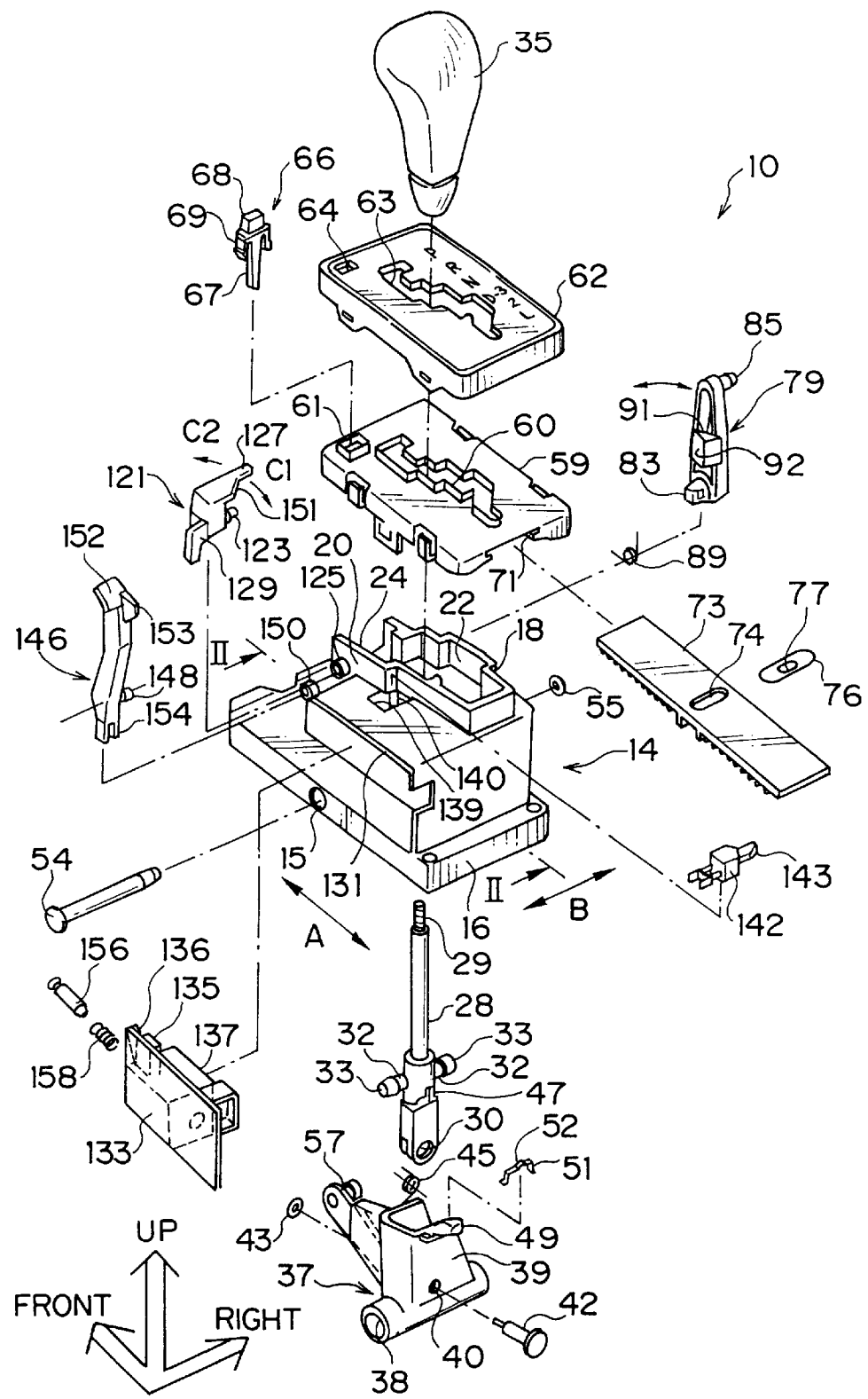
FIG. 1 is an exploded perspective view of a main portion of a shift lever device relating to an embodiment of the present invention.

FIGS. 1 and 2 show a shift lever device relating to an embodiment of the present invention. This shift lever device 10 is applied to an automobile equipped with an automatic transmission. As shown in FIG. 2, the shift lever device 10 includes a base plate 12 and a gate block 14 which are disposed in a center tunnel provided at the lower portion of a floor of a vehicle. The base plate 12 is secured and fixed to a frame of the vehicle body by bolts or the like and the gate block 14 is attached to this base plate 12.

As shown in FIG. 2, the inner portion of the gate block 14 is hollow. As shown in FIG. 1, a base portion 16 whose outer configuration is in the form of a thick plate is provided at the lower portion of the gate block 14. A pair of wall bodies 18 and 20 are stood upright at the upper portion of this base portion 16 and extend in the longitudinal direction of the vehicle (the direction of arrow A). The inner surfaces of these wall bodies 18 and 20 which are opposite each other are gate walls 22 and 24. The gate walls 22 and 24 are respectively formed by substantially vertically formed convexoconcave surfaces and used for guiding a shift lever 26 in a predetermined shift direction.

A lever shaft 28 is provided at an axial direction intermediate portion of the shift lever 26. A male screw portion 29 is formed at the upper end portion of this lever shaft 28 and a shaft receiving hole 30 penetrates through the lower end portion of the lever shaft 28 in the longitudinal direction of the vehicle. Further, at the outer circumferential end portions of the lever shaft 28, guide projections 32 which respectively extend outwardly in the transverse direction of the vehicle (the direction of arrow B in FIG. 1) are provided so as to be coaxial with each other. Cushion caps 33 which are formed by soft materials such as rubbers, elastomers, PPs (phenolphthalein phosphates), or the like are fit into the distal end portions of these guide projections 32.

A shift knob 35, which is screwed and fixed to the male screw portion 29 of the lever shaft 28, is provided at the lower end portion of the shift lever 26. Further, a retainer 37 is connected to the lower end portion of the lever shaft 28.

A pipe-shaped shaft receiving portion 38 is provided at the lower portion of the retainer 37 so that the axial direction of the shaft receiving portion 38 is the transverse direction of the vehicle. A shaft connecting portion 39, which protrudes upwardly from the outer circumferential surface of this shaft receiving portion 38, is provided at the retainer 37. This shaft connecting portion 39 is pipe-shaped and the upper end portion and the one end portion (the right end portion in FIG. 1) thereof in the transverse direction of the vehicle are opened. Supporting shaft holes 40 penetrate through a pair of wall portions of the shaft connecting portion 39 in the longitudinal direction of the vehicle so that the supporting shaft holes 40 are coaxial with each other.

A portion of the lever shaft 28 which is below the guide projection 32 is inserted into the shaft connecting portion 39 of the retainer 37 and the lever shaft 28 is connected to the shaft connecting portion 39 via a shaft pin 42. The shaft pin 42 is inserted through the one supporting shaft hole 40 of the shaft connecting portion 39 and penetrates through the shaft receiving hole 30 of the lever shaft 28. The distal end portion of the shaft pin 42 protrudes from the other supporting shaft hole 40. A ring-shaped push nut 43 is fit and inserted into the distal end portion of the shaft pin 42 and the shaft pin 42 is fixed to the shaft connecting portion 39. In this way, the shaft connecting portion 39 supports the lever shaft 28 so that the lever shaft 28 is swingable around the shaft pin 42.

As shown in FIG. 1, a torsion spring 45 is fit into the outer circumferential surface of the shaft pin 42, and this torsion spring 45 invariably urges the lever shaft 28 clockwise around the shaft pin 42. A select projection 47, which protrudes rearward toward a region corresponding to the upper end portion of the shaft connecting portion 39, is provided on the outer circumferential surface of the lever shaft 28. The lower end portion of this select projection 47 is wedge-shaped and pointed downward.

On the other hand, a spring attachment portion 49, which attaches a spring in correspondence to the select projection 47, is provided at the upper end portion of the shaft connecting portion 39. An elongated plate-shaped select spring 51 is fit into this spring attachment portion 49. A click portion 52, which is bent in the shape of a roof so as to protrude upwardly, is formed at the longitudinal direction center portion of the select spring 51. The select spring 51 is supported by the spring attachment portion 49 so that an intermediate portion of the select spring 51 including the click portion 52 can be deformed vertically.

When a vehicle operator moves the shift lever 26 from the one end to the other end in the transverse direction of the vehicle, the select projection 47 crosses the click portion 52 while the select projection 47 of the lever shaft 28 presses and contacts the click portion 52 and deflects the select spring 51 downward. In this way, the vehicle operator senses a click when the shift lever 26 is moved from the one end to the other end in the transverse direction of the vehicle, and due to this sensing of the clicking, the vehicle operator can sense that the movement of the shift lever 26 from the one end to the other end in the transverse direction of the vehicle has been completed.

Further, when the shift lever 26 is moved in the direction of the wall body 18 against the urging force of the torsion spring 45, the click portion 52 generates resilient resistance force on the select projection 47. Accordingly, when the vehicle operator does not apply operating force to the shift lever 26, the movement of the shift lever 26 toward the wall body 20 is prevented due to the urging force of the torsion spring 45.

As shown in FIG. 2, the retainer 37 is accommodated within the gate block 14 and is connected thereto via a control shaft 54 shown in FIG. 1. The distal end surfaces of the pair of guide projections 32 of the lever shaft 28 respectively oppose the gate walls 22 and 24, and the portion of the lever shaft 28 which is above the guide projections 32 protrudes upwardly and passes between the gate walls 22 and 24. As a result, the range in which the shift lever 26 swings in the transverse direction of the vehicle is limited to the position at which the right guide projection 32 abuts the gate wall 22 to the position at which the left guide projection 32 abuts the gate wall 24.

Supporting shaft holes 15 are punched at the side wall portions of the base portion 16 of the gate block 14 so that the supporting shaft holes 15 are coaxial with each other. The control shaft 54 is inserted through the one supporting shaft hole 15 and inserted through the shaft receiving portion 38 of the retainer 37, and the distal end portion of the control shaft 54 protrudes from the other supporting shaft hole 15. A ring-shaped push nut 55 is fit and inserted into the distal end portion of the control shaft 54 and the control shaft 54 is fixed to the wall portions of the base portion 16. In this way, the gate block 14 supports the shift lever 26 so that the shift lever 26 is swingable around the control shaft 54 in the longitudinal direction of the vehicle.

In the shift lever device 10, the opening width between the gate walls 22 and 24 in the transverse direction of the vehicle is slightly larger than the distance between the distal ends of the pair of guide projections 32 provided at the lever shaft 28. Consequently, when the vehicle operator carries out shift operation, the respective guide projections 32 are guided to the gate walls 22 and 24 and the shift lever 26 can be moved zigzag in the longitudinal direction of the vehicle and the transverse direction thereof.

Further, a connecting arm 57 which extends forward from the outer peripheral surface of the shaft connecting portion 39 in the front direction of the vehicle is provided at the retainer 37, and this connecting arm 57 is connected to an automatic transmission (not shown) via a connecting mechanism such as a link mechanism or the like. In this way, in association with shift operation of the shift lever 26, the operating force corresponding to the shift operation is mechanically transmitted to the automatic transmission and the automatic transmission effects speed changes or the like.

The shift lever device 10 includes a housing 59 and a housing cover 62 which close an opening portion of the center tunnel. As shown in FIG. 1, the housing 59 is formed in the shape of a thin cabinet and the lower surface thereof is opened. A zigzag guide groove 60, which connects shift ranges in the shift direction of the shift lever 26, is formed at this housing 59. Further, the housing cover 62 is formed in the shape of a cabinet and is one size larger than the housing 59. The housing 59 is covered with the housing cover 62 so that the housing 59 is not exposed at the vehicle compartment side. When viewed from above, a guide groove 63 which has substantially the same configuration as that of the guide groove 60 of the housing 59 is formed at the housing cover 62. This guide groove 63 agrees with the guide groove 60 of the housing 59 in a state in which the housing 59 is covered with the housing cover 62.

Moreover, indication marks (in the present embodiment, P, R, "N", D-3, 2, L) for indicating a shift range at the position corresponding to each of the shift ranges of the shift lever 26 are printed on the top surface of the housing cover 62.

On the top plate portion of the housing 59, a rod hole 61, through which a rod portion 67 of a push button 66 for releasing a shift lock is inserted, is formed at one corner portion at the vehicle front side. On the other hand, a button hole 64, through which a top portion 68 of the push button 66 is inserted, is formed on the housing cover 62. A leaf spring 69 is formed integrally with the push button 66 and urges the push button 66 upward. When a vehicle operator depresses the push button 66 against the leaf spring 69, a shift lock link 146, which will be described later, can be moved from a LOCK position to a unlocked position.

The lever shaft 28 of the shift lever 26 protrudes to the vehicle compartment side through the guide grooves 60 and 63. The vehicle operator holds the shift knob 35 which is fixed to the upper end portion of the lever shaft 28 and carries out shift operation of the shift lever 26.

A slide groove 71, which extends in the longitudinal direction of the vehicle, is formed on the lower surface of the housing 59 and an elongated slide cover 73 is slidably fit into this slide groove 71. A long hole 74, which is long in the transverse direction of the vehicle, is formed at the longitudinal direction center portion of the slide cover 73. The lever shaft 28 of the shift lever 26 is inserted through this long hole 74. In this way, the slide cover 73 is moved integrally with the shift lever 26 in the longitudinal direction of the vehicle, and the movement of the shift lever 26 in the transverse direction of the vehicle is allowed by the long hole 74.

A shield cover 76 is disposed between the housing 59 and the slide cover 73, and a round hole 77, through which the lever shaft 28 of the shift lever 26 is inserted, is formed at the shield cover 76. This shield cover 76 shields a gap which is formed between the long hole 74 and the outer circumferential surface of the lever shaft 28.

The shift lever device 10 includes a driving member in the form of lever 79 which is connected to a key interlock mechanism 94 (see FIG. 2), which will be described later. As shown in FIG. 1, a substantially cylindrical rod-shaped supporting shaft portion 83, which protrudes in one direction of the transverse direction of the vehicle, is provided at the lower end portion of the driving lever 79.

On the other hand, as shown in FIG. 2, a cylindrical shaft receiving portion 81 is provided on the outer surface of the wall body 18. This shaft receiving portion 81 is provided at a region of the gate wall 22 which corresponds to the "P" range. The supporting shaft portion 83 of the driving lever 79 is rotatably inserted into the shaft receiving portion 81. In this way, the driving lever 79 is supported swingably at a released position shown by a solid line in FIG. 2 and a restricted position shown by a double-dashed chain line therein.

As shown in FIG. 1, a connecting pin 85, which protrudes in the direction opposite that of the supporting shaft portion 83 in the transverse direction of the vehicle, is provided at the swinging end portion of the driving lever 79. As shown in FIG. 2, one end of a wire connecting mechanism 87 is connected to this connecting pin 85.

An urging member in the form of a torsion spring 89 shown in FIG. 1 is fit and inserted into the outer circumferential surface of the supporting shaft portion 83 of the driving lever 79, and this torsion spring 89 urges the driving lever 79 in the rear direction of the vehicle. Projected stopper portions (not shown), which stop the driving lever 79 urged by the torsion spring 89 at the restricted position, are provided on the outer surfaces of the wall bodies 18 and 20. As a result, when pressing force of the shift lever 26 is not applied to the driving lever 79, the driving lever 79 is pressed and contacted with the stopper portions and held at the restricted position.

As shown in FIG. 1, a pressed portion 91 is provided integrally with the side surface portion of the driving lever 79. This pressed portion 91 is disposed at the longitudinal direction center portion of the driving lever 79 and, as shown in FIG. 2, is supported at the position which is slightly higher than the upper ends of the wall bodies 18 and 20. A cam surface 92 is formed at one end portion of the pressed portion 91 in the longitudinal direction of the vehicle. This cam surface 92 has a plain surface or a curved surface which is inclined rearward in the longitudinal direction of the vehicle. The pressed portion 91 extends the cam surface 92 from the inner surface of the driving lever 79 to the position which corresponds to the "P" range between the gate walls 22 and 24 in the transverse direction of the vehicle.

In the shift lever device 10 of the present embodiment, when the shift lever 26 is moved to the "P" range from the shift range other than the "P" range, it is necessary to go through an "R" range. In the shift operation in which the shift lever 26 is moved from the "R" range to the "P" range, it is necessary to effect the following three operations in succession: first, the shift lever 26 which is set to the "R" range in the vicinity of the gate wall 22 is moved to the gate wall 24 side in the transverse direction of the vehicle; next, the shift lever 26 is moved in the front direction of the vehicle along this gate wall 24; and last, the shift lever 26 is moved to the "P" range in the vicinity of the gate wall 22 in the transverse direction of the vehicle.

Further, in the shift operation in which the shift lever 26 is moved from the "P" range to the "R" range, it is necessary to effect successively three operations for moving the shift lever 26 opposite which are opposite to those of the shift operation in which the shift lever 26 is moved from the "R" range to the "P" range.

In the shift lever device 10, when the vehicle operator moves the shift lever 26 from the gate wall 24 side to the "P" range, the lever shaft 28 abuts the cam surface 92 of the pressed portion 91 at the position before the lever shaft 28 enters the "P" range. When the lever shaft 28 further moves to the "P" range side, the lever shaft 28 applies component of force to the driving lever 79 in the direction of the released position while the lever shaft 28 slides against the cam surface 92. In this way, the driving lever 79 swings from the restricted position to the released position against the urging force of the torsion spring 89.

Figure 3A:
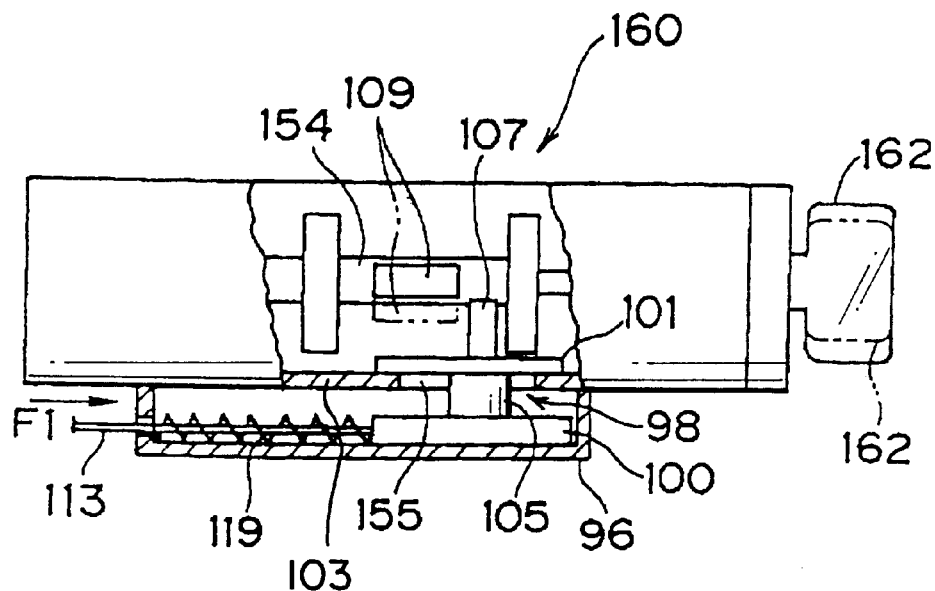
FIG. 3A is a side view which shows a lock released state caused by the key interlock mechanism relating to the embodiment of the present invention.
Figure 3B:
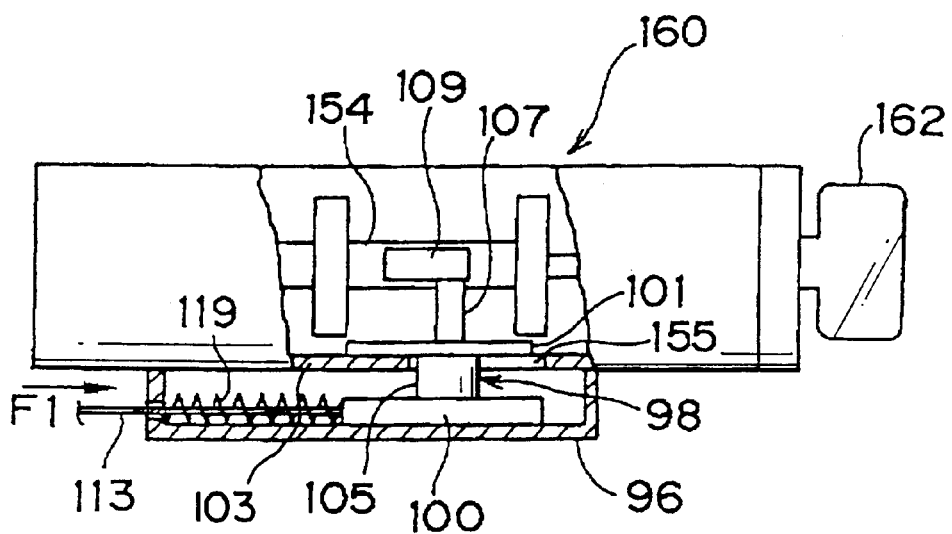
FIG. 3B is a side view which shows a key locked state caused by the key interlock mechanism relating to the embodiment of the present invention.

A key interlock mechanism 94 shown in FIG. 2 is attached to an automobile to which the shift lever 26 relating to the present embodiment is applied. As shown in FIGS. 3A and 3B, the key interlock mechanism 94 includes a holder 96 which is fixed onto the outer circumferential surface of a key cylinder 160 and a slide member 98 which is accommodated within this holder 96.

The slide member 98 includes a pair of slide plates 100 and 101. The one slide plate 100 is disposed within the key cylinder 160 and the other slide plate 101 is disposed within the holder 96. Further, a guide groove 155, which is elongated in the axial direction of a rotational shaft 154, is formed at the circumferential wall portion of the key cylinder 160.

The pair of slide plates 100 and 101 are connected by a connecting portion 105 which is inserted through a guide groove 103 of the key cylinder 160. In this way, the slide member 98 is movable from an unlocked position shown in FIG. 3A to a LOCK position shown in FIG. 3B.

In FIG. 3A, a state in which a key 162 and the rotational shaft 154 are disposed at an ACC position is shown by a solid line and a state in which the key 162 and the rotational shaft 154 are disposed at a LOCK position is shown by a double-dashed chain line.

A lock pin 107, which protrudes toward the rotational shaft 154 in the direction of the outer circumferential tangent of the rotational shaft 154, is provided integrally with the slide plate 100 of the slide member 98. On the other hand, a lock cam 109, which protrudes toward the outer circumference of the rotational shaft 154 in the radial direction thereof, is formed integrally with the outer circumferential surface thereof.

As shown in FIG. 3A, when the slide member 98 is disposed at the unlocked position, the lock pin 107 does not interfere with the lock cam 109. In this way, the key 162 and the rotational shaft 154 are rotatable from the ACC position to the LOCK position.

Moreover, as shown in FIG. 3B, when the slide member 98 is disposed at the LOCK position and the key 162 and the rotational shaft 154 are disposed at the ACC position, the lock pin 107 engages with the lock cam 109 such that the rotation of the key 162 and the rotational shaft 154 to the LOCK position is prevented. Accordingly, the key 162 cannot be removed from the key cylinder 160 in this state.

As shown in FIG. 2, the one end portion of the wire connecting mechanism 87 is connected to the driving lever 79 and the other end portion of thereof is connected to the slide plate 100 of the key interlock mechanism 94.

The wire connecting mechanism 87 includes a connecting member which may be a high tensile wire 113 which is inserted through a flexible tube 111, and this wire 113 is movable within the flexible tube 111. A connecting tool 115 is adhered to the end portion of the wire 113 at the driving lever 79 side. This connecting tool 115 is engaged and fixed to the connecting pin 85 of the driving lever 79 and is supported rotatably around the connecting pin 85.

Further, the wire connecting mechanism 87 includes a securing member 117 which is secured and fixed to the base plate 12. This securing member 117 supports the end portion of the flexible tube 111 at the driving lever 79 side.

Moreover, as shown in FIGS. 3A and 3B, a coil spring 119 is fit and inserted into the end portion of the wire 113 at the slide member 98 side. The coil spring 119 is compressed and is inserted into the holder 96 together with the end portion of the wire 113. This coil spring 119 urges the slide member 98 in the direction of the unlocked position, and tensile force $F_1$, which is in accordance with the urging force of the coil spring 119, is applied to the wire 113 which is connected to the slide member 98.

On the other hand, in addition to the tensile force $F_1$, tensile force $F_2$, which is in the direction opposite that of the tensile force $F_1$, is applied to the wire 113 by the torsion spring 89 via the driving lever 79. This tensile force $F_2$ of the torsion spring 89 is larger than the tensile force $F_1$ of the coil spring 119. Consequently, in a state in which the driving lever 79 is held at the restricted position, the slide member 98 is held at the LOCK position by force $F_3$ (=tensile force $F_2$−tensile force $F_1$).

Further, when the driving lever 79 is moved from the restricted position in the direction of the released position due to the pressure-applying force of the shift lever 26, the slide member 98 slides from the locked position in the direction of the unlocked position. When the driving lever 79 is moved to the released position, as shown in FIG. 3A, the slide member 98 slides to the unlocked position.

As shown in FIG. 1, a link for detecting a "P" range (hereinafter, "P detection link") 121 is disposed at the wall body 20 which is on the side opposite the wall body 18 at which the driving lever 79 is disposed. A supporting shaft portion 123 is provided at the lower end portion of the P detection link 121. This supporting shaft portion 123 is rotatably inserted into a cylindrical rod-shaped shaft receiving portion 125 provided at the wall body 20. In this way, the P detection link 121 is supported swingably around the shaft receiving portion 125.

An arm portion 127, which is slightly above the upper end of the wall body 20 and protrudes toward the wall bodies 18 and 20 in the transverse direction of the vehicle, is formed at the P detection link 121. This arm portion 127 extends to the position which corresponds to the "P" range between the gate walls 22 and 24. Further, a plate-shaped striker portion 129, which protrudes toward the side opposite the arm portion 127, is formed at the lower portion of the P detection link 121.

On the other hand, as shown in FIG. 1, a housing portion 131 whose side surface portion which is on the side opposite the wall body 20 is opened is provided on the outer side of the wall body 20. A flat plate-shaped supporting substrate 133 is attached to this housing portion 131 so as to close the side surface portion thereof. A "P" range detection switch (hereinafter, "P detection switch") 135 and a electromagnetic solenoid 137 are attached to the supporting substrate 133. These P detection switch 135 and electromagnetic solenoid 137 are supported by the supporting substrate 133 so that the P detection switch 135 and the electromagnetic solenoid 137 are accommodated within the housing portion 131.

Moreover, a concave holder portion 139 is formed at the top plate portion of the housing portion 131, and a through-hole 140, which penetrates through the wall bodies 18 and 20 and opens to the gate wall 22, is formed within this holder portion 139. A "D" range detection switch (hereinafter, D detection switch) 142 is accommodated within the holder 139. A push button 143 is provided at the D detection switch 142. This push button 143 penetrates through the through-hole 140 and protrudes to the position corresponding to the "D" range between the gate walls 22 and 24. When the shift lever 26 is moved to the "D" range from the position other than the "D" range, the D detection switch 142 is turned on. Further, when the shift lever 26 is moved from the "D" range to the position other than the "D" range, the D detection switch is turned off.

In the shift lever device 10, the P detection switch 135 and the electromagnetic solenoid 137, which are disposed at the housing portion 131, and the D detection switch 142 are connected to an ECU (electronic control unit), which controls the automatic transmission, by a harness or the like.

A lever 136 is disposed at the front end portion of the P detection switch 135. This lever 136 is supported swingably in the longitudinal direction of the vehicle and urged toward the front of the vehicle. The P detection switch 135 presses and contacts the lever 136 with the striker portion 129 of the P detection link 121. In this way, when viewing from the left-hand side of the shift lever device 10, the P detection link 121 is urged clockwise (the direction of arrow C1 in FIG. 1) due to the urging force of the lever 136.

In the shift lever device 10, when the shift lever 26 is moved to the "P" range from the position other than the "P" range, the lever shaft 28 presses the arm portion 127 and rotates the P detection link 121 counterclockwise (the direction of arrow C2 in FIG. 1) against the urging force of the lever 136. In this way, the detection lever 136 is swung from the off position to the on position and the P detection switch 135 is turned on.

Further, when the shift lever 26 is moved from the "P" range to the position other than the "P" range, the lever shaft 28 is separated from the arm portion 127 of the P detection link 121. In this way, the P detection link 121 is rotated clockwise due to the urging force of the detection lever 136, the lever 136 is returned to the off position, and the P detection switch 135 is turned off.

When the P detection switch 135 is turned on, the ECU effects control for forming a parking state such as locking of an output shaft (not shown) of the automatic transmission. Moreover, when the P detection switch 135 is turned off, the ECU effects control for releasing a parking state such as releasing the locking of the output shaft of the automatic transmission.

As shown in FIG. 1, a side wall portion, which swells to the left with respect to the wall bodies 18 and 20, is formed beneath the wall body 20 of the gate block 14, and an elongated lever-shaped shift lock link 146 is disposed on the outer surface of this side wall portion. A supporting shaft portion 148, which protrudes in the transverse direction of the vehicle, is provided at the region of the one side surface of this shift lock link 146 which is below the longitudinal direction center portion thereof.

On the other hand, a cylindrical rod-shaped shaft receiving portion 150 is provided on the outer surface of a side wall portion 144 and the supporting shaft portion 148 of the shift lock link 146 is rotatbly inserted into this shaft receiving portion 150. In this way, the shift lock link 146 is supported by the side wall portion 144 so as to be swingable around the shaft receiving portion 150.

At the upper end portion of the shift lock link 146, a cam surface 152 which is inclined downward in the rear direction is formed, and an engaging plate 153 which protrudes rearward from the lower end portion of this cam surface 152 is provided.

Further, a connecting groove 154 which is U-shaped in the longitudinal direction of the vehicle is formed at the lower end portion of the shift lock link 146. A distal end portion of a plunger 156 of the electromagnetic solenoid 137, which is accommodated within the housing portion 131, is fit and inserted into this connecting groove 154. A coil spring 158 is fit and inserted into the outer circumferential surface of this plunger 156, and the plunger 156 is invariably urged by this coil spring 158 in the protruding direction.

When the electromagnetic solenoid 137 is not energized by the ECU and is turned off, the electromagnetic solenoid 137 does not apply force to the plunger 156. Moreover, when the electromagnetic solenoid 137 is energized and turned on, the electromagnetic solenoid 137 applies force to the plunger 156 in the withdrawing direction. In this way, when the electromagnetic solenoid 137 is turned on, the plunger 156 is moved in the withdrawing direction against the urging force of the coil spring 158 and the shift lock link 146 is rotated by this plunger 156 from the restricted position to the released position.

Further, when the electromagnetic solenoid 137 is turned off from the on state, the plunger 156 is moved in the protruding direction due to the urging force of the coil spring 158 and the shift lock link 146 is rotated by this plunger 156 from the released position to the restricted position.

When the shift lock link 146 is moved to the restricted position in a state in which the P detection link 121 is disposed at the on position, the engaging plate 153 of the shift lock link 146 enters the lower portion of the arm portion 127 of the P detection link 121 and rotation of the P detection link 121 in the direction of the off position is prevented. In this way, the movement of the shift lever 26 in the "P" range toward the gate wall 24 is prevented by a stopper portion 151 of the P detection link 121, and the shift lever device 10 is disposed in the shift locked state in which the shift operation of the shift lever 26 cannot be performed.

Moreover, when the shift lock link 146 is moved from the restricted position to the released position in a state in which the P detection link 121 is disposed at the on position, the engaging plate 153 of the shift lock link 146 is separated from the lower portion of the arm portion 127 of the P detection link 121 and the rotation of the P detection link 121 in the direction of the off position is allowed. As a result, the shift lever 26 in the "P" range can be moved toward the gate wall 22 while the P detection link 121 is swung toward the off position, and the shift lever device 10 is disposed in the lock released state in which the shift operation of the shift lever 26 is possible.

When the shift lever 26 is moved to the "P" range, and thereafter, the key 162 which is inserted into the key cylinder 160 is rotated to the LOCK position, the ECU which controls the automatic transmission stops the flow of electricity to the electromagnetic solenoid 137 and the shift lever device 10 is disposed in the shift locked state. Further, when the key 162 inserted into the key cylinder 160 is rotated to the ON position, and thereafter, a brake pedal (not shown) is depressed, the ECU starts the flow of electricity to the electromagnetic solenoid 137 and the shift lever device 10 is disposed in the lock released state.

The cam surface 152 of the shift lock link 146 is provided so as to correspond to the rod portion 67 of the push button 66 which is disposed at the housing 59. When the push button 66 is depressed in a state in which the shift lock link 146 is disposed at the restricted position, the rod portion 67 applies component of force to the shift lock link 146 in the releasing direction while the rod portion 67 slides against the cam surface 152. Accordingly, when a vehicle operator or the like depresses the push button 66, the shift lock link 146 is moved from the restricted position to the released position against the urging force of the coil spring 158 and the shift lever device 10 can be moved forcibly from the shift locked state to the lock released state.

Operation of the Embodiment

Next, the operation of the shift lever device 10 relating to the present embodiment will be explained. When the state of the automobile to which the shift lever device 10 is attached is changed from an idling state to a parking state, the shift lever 26 is moved from a shift range such as an "N" range or the like to a "P" range. The driving lever 79, which is at the released position shown by a double-dashed chain line in FIG. 2, is swung to the restricted position shown by a solid line by this shift lever 26. In association with this movement, the slide member 98 of the key interlock mechanism 94 slides from the LOCK position shown in FIG. 3B to the unlocked position shown in FIG. 3A. As a result, the locked state caused by the key interlock mechanism 94 is released and the key 162, which is inserted into the key cylinder 160, is rotatable from the ACC position to the LOCK position.

The key 162 can be removed from the key cylinder 160 only when the key 162 is disposed at the LOCK position. Accordingly, whenever the automobile is in the parking state, the vehicle operator moves the shift lever 26 to the "P" range, rotates the key 162 to the LOCK position, and thereafter, removes the key 162 from the key cylinder 160.

When the shift lever 26 is moved to the "P" range, the P detection link 121 is swung counterclockwise (the direction of arrow C2 in FIG. 1) so as to turn on the P detection switch 135. The ECU determines that the shift lever 26 has moved to the "P" range due to the signal from the P detection switch 135 and the shift lock link 146 is swung to the restricted position by the electromagnetic solenoid 137. In this way, the shift lever device 10 is disposed in the shift locked state and the shift operation of the shift lever 26 cannot be carried out. Further, when the P detection switch 135 is turned on, the ECU effects control for putting the automobile in the parking state such as the locking of the output shaft of the automatic transmission.

Moreover, when the state of the automobile is changed from the parking state to the idling state, the vehicle operator rotates the key 162, which is inserted into the key cylinder 160, from the LOCK position to the ON position while depressing the brake pedal. Accordingly, the ECU turns on the electromagnetic solenoid 137, the shift lock link 146 is swung to the released position by the electromagnetic solenoid 137, and the shift locked state of the shift lever device 10 is thereby released. The key 162 is rotated from this state to a START position until an engine starts, and the key 162 is returned to the ON position after the starting of the engine. Then, the automobile is disposed in the idling state.

In accordance with the shift lever device 10 relating to the present embodiment described above, mechanical operating force can be directly supplied to the key interlock mechanism interlockingly with the shift operation of the shift lever 26. Therefore, the key interlock mechanism 94 no longer needs a driving source such as an electromagnetic solenoid or the like which receives power supply from the ECU, and the ECU also does not require a relay circuit for control or a power circuit for driving which receives a signal from the P detection switch 135 and operates. Thus, the structures of the key interlock mechanism 49 and the ECU can be simplified.

In the shift lever device 10 of the present embodiment, the driving lever 79 is connected to the key interlock mechanism 94 via the wire connecting mechanism 87. However, various types of connecting mechanisms, for example, a link mechanism or the like may be used other than the wire connecting mechanism 87. Moreover, if the connecting mechanism can be disposed linearly, operating force may be transmitted from the driving lever 79 to the key interlock mechanism 94 by moving a rigid body such as a shaft linearly.

What is claimed is:

1. A shift lever device for use in a vehicle having an automatic transmission with a park setting, a key cylinder and a key interlock mechanism for restricting key rotation in at least one transmission setting when a key is inserted in the key cylinder, the shift lever device comprising:

(a) a shift lever adapted for mounting in a vehicle and when mounted therein, being shiftable in longitudinal and transverse directions of the vehicle, wherein a shift location range is defined as a parking range for placing an automatic transmission in the vehicle in a park setting;

(b) a connecting member having two ends, with one end being adapted for connection to a biasing member of the key interlock mechanism in the vehicle that applies a tensile force $F_1$ to said one end;

(c) a driving member connected to the other end of the connecting member, the driving member being movable to a released position and a restricted position, and when said driving member moves from the released position to the restricted position, said driving member transmits force to the key interlock mechanism in a direction for restricting key rotation via said connecting member when connected to the key interlock mechanism and when said driving member moves from the restricted position to the released position, said driving member transmits force to the key interlock mechanism via said connecting member when connected to the key interlock mechanism, in a direction for releasing restricted rotation in the key interlock mechanism;

(d) an urging member mounted for urging said driving member to the restricted position when the shift lever is in a location outside of the parking range, said urging member applying a second tensile force $F_2$ to said other end of the connecting member that is greater than tensile force $F_1$; and (e) a pressing portion integrally provided on said driving member, which is pressed by said shift lever when the shift lever is shifted to the parking range, causing said driving member to move from the restricted position to the released position against said urging force $F_2$ of the urging member.

2. The shift lever device of claim 1, wherein said connecting member comprises a high tensile wire.

3. The shift lever device of claim 1, wherein said connecting member comprises a link mechanism.

4. The shift lever device of claim 1, wherein said connecting member comprises a substantially straight shaft.

5. The shift lever device of claim 1, further comprising a supporting member axially supporting said driving member so that said driving member is swingable.

6. The shift lever device of claim 5, wherein the released position of said driving member corresponds to the parking range for said shift lever.

7. The shift lever device of claim 5, wherein the restricted position of said driving member corresponds to a position other than the parking range for said shift lever.

8. The shift lever device of claim 1, wherein said pressing portion comprises a substantially planar surface inclined rearward relative to the vehicle.

9. The shift lever device of claim 8, further comprising a supporting member having a wall extending upward relative to the vehicle when the shift lever is mounted in the vehicle, wherein the planar surface of the pressing portion extends from the driving member to said wall.

10. The shift lever device of claim 1, wherein said pressing portion comprises a curved surface inclined rearward relative to the vehicle.

11. The shift lever device of claim 10, further comprising a supporting member having a wall extending upward relative to the vehicle when the shift lever is mounted in the vehicle, wherein the curved surface of the pressing portion extends from the driving member to said wall.

12. The shift lever device of claim 1, wherein the driving member has a length, and the pressing portion is provided at approximately mid-length on the drive member.

13. A shift lever device for use in a vehicle having an automatic transmission with a park setting, a key cylinder and a key interlock mechanism for restricting key rotation in at least one transmission setting when a key is inserted in the key cylinder, the shift lever device comprising:

(a) a shift lever adapted for mounting in a vehicle and when mounted therein, being shiftable in longitudinal and transverse directions of the vehicle, wherein a shift location range is defined as a parking range for placing an automatic transmission in the vehicle in a park setting;

(b) a connecting member having two ends, with one end being adapted for connection to a biasing member of the key interlock mechanism in the vehicle that applies a tensile force $F_1$ to said one end;

(c) a driving member connected to the other end of the connecting member, the driving member being movable to a released position and a restricted position, and when said driving member moves from the released position to the restricted position, said driving member transmits mechanical force to the key interlock mechanism in a direction for restricting key rotation via said connecting member when connected to the key interlock mechanism, and when said driving member moves from the restricted position to the released position, said driving member transmits mechanical force to the key interlock mechanism via said connecting member when connected to the key interlock mechanism, in a direction for releasing restricted rotation in the key interlock mechanism;

(d) an urging member mounted for urging said shift lever to the restricted position when the shift lever is in a location outside of the parking range, said urging member applying a second tensile force $F_2$ to said other end of the connecting member that is greater than tensile force $F_1$; and (e) a pressing portion provided on said driving member, which is pressed by said shift lever when the shift lever is shifted to the parking range, causing said driving member to move from the restricted position to the released position.

14. The shift lever device of claim 13, wherein said pressing portion comprises a substantially planar surface inclined rearward relative to the vehicle.

15. The shift lever device of claim 13, wherein said pressing portion comprises a curved surface inclined rearward relative to the vehicle.

16. A shift lever device for use in a vehicle having an automatic transmission with a park setting, a key cylinder and a key interlock mechanism for restricting key rotation in at least one transmission setting when a key is inserted in the key cylinder, the shifter lever device comprising:

(a) a shift lever adapted for mounting in a vehicle and when mounted therein, being shiftable in longitudinal and transverse directions of the vehicle, wherein a shift location range is defined as a parking range for placing an automatic transmission in the vehicle in a park setting;

(b) a connecting member having two ends, with one end being adapted for connection to the key interlock mechanism in the vehicle;

(c) a driving member connected to the other end of the connecting member, the driving member being movable to a released position and a restriction position, and when said driving member moves from the released position to the restricted position, said driving member transmits force to the key interlock mechanism in a direction for restricting key rotation via said connecting member when connected to the key interlock mechanism, and when said driving member moves from the restricted position to the released position, said driving member transmits force to the key interlock mechanism via said connecting member when connected to the key interlock mechanism, in a direction for releasing restricted rotation in the key interlock mechanism;

(d) an urging member mounted for urging said driving member to the restricted position when the shift lever is in a location outside of the parking range;

(e) a pressing portion integrally provided on said driving member, which is pressed by said shift lever when the shift lever is shifted to the parking range, causing said driving member to move from the restricted position of the released position against an urging force of the urging member, wherein said pressing portion comprises a substantially planar surface inclined rearward relative to the vehicle, and further comprising a supporting member having a wall extending upward relative to the vehicle when the shift lever is mounted in the vehicle, wherein the planar surface of the pressing portion extends from the driving member to said wall.

* * * * *